United States Patent

DiMarcello et al.

[11] Patent Number: 6,030,664
[45] Date of Patent: Feb. 29, 2000

[54] BICONIC COATING DIE FOR MAKING COATED OPTICAL FIBERS

[75] Inventors: Frank V. DiMarcello, Annandale; Arthur C. Hart, Chester; Richard G. Huff, Basking Ridge; Karen S. Kranz, Middlesex, all of N.J.; Lisa M. Larsen-Moss, Stone Mountain, Ga.

[73] Assignee: Lucent Technologies Inc., Murray Hill, N.J.

[21] Appl. No.: 09/116,548

[22] Filed: Jul. 15, 1998

[51] Int. Cl.[7] .................. B05D 1/18; B05D 1/36; B05D 5/06; B05C 3/12

[52] U.S. Cl. .................. 427/402; 427/163.2; 427/389.8; 427/407.3; 427/434.7; 118/405; 118/420; 65/447; 65/529

[58] Field of Search .................. 427/163.2, 434.7, 427/402, 407.3, 389.8; 118/405, 420; 65/447, 529

[56] References Cited

U.S. PATENT DOCUMENTS 4,704,307  11/1987  Jochem et al. .................. 427/163.2
5,127,361  7/1992  Matsuda et al. .................. 118/405

Primary Examiner—Katherine A. Bareford

[57] ABSTRACT

A method and apparatus for high velocity dual coating optical fibers includes passing the fiber to be coated through an entrance die into a coating reservoir, to which liquid coating material is supplied under pressure. The diameter of the die passage and the pressure of the fluid is sufficient to prevent air from entering the reservoir. The coated fiber is passed through a centering and sizing die wherein the recirculation of excess coating material is controlled to produce centering forces on the fiber at the high fiber velocity, and wherein the initial coating is sized. The fiber is then passed through a second coating reservoir into an exit die which sizes the second coating. Upon leaving the exit die, the coatings are cured.

12 Claims, 4 Drawing Sheets

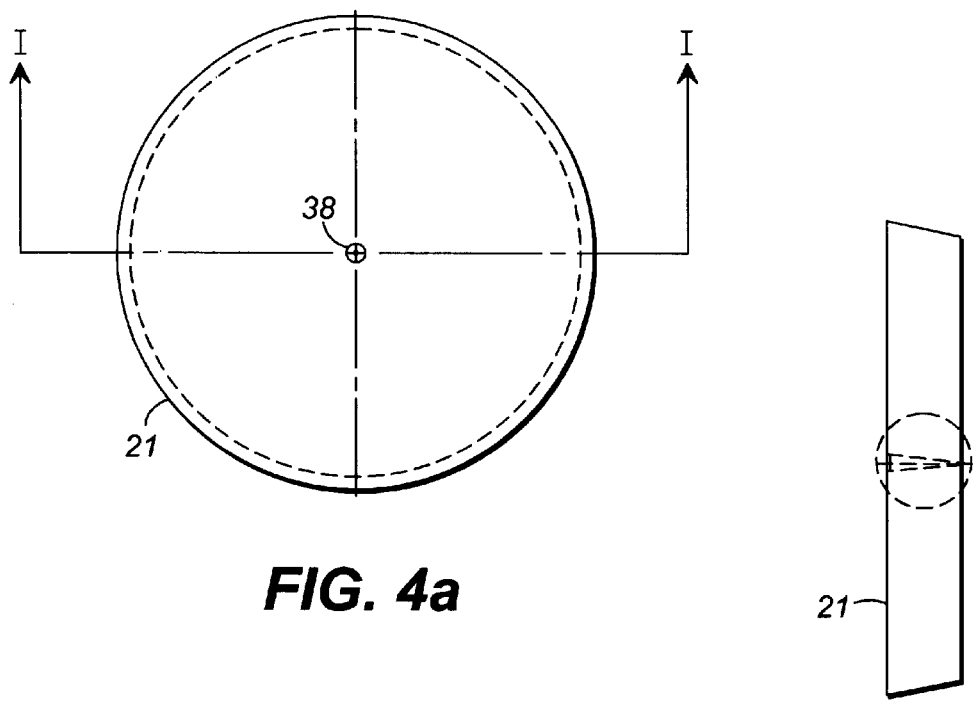
FIG. 4a
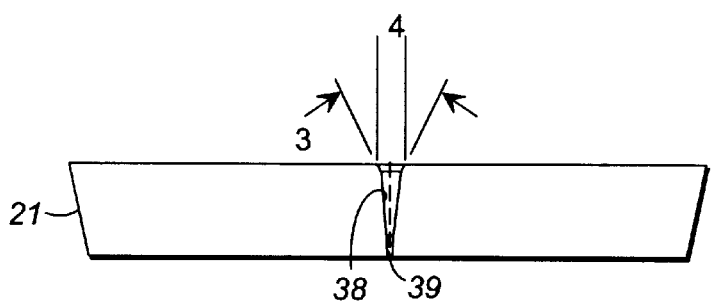
FIG. 4b
FIG. 4c
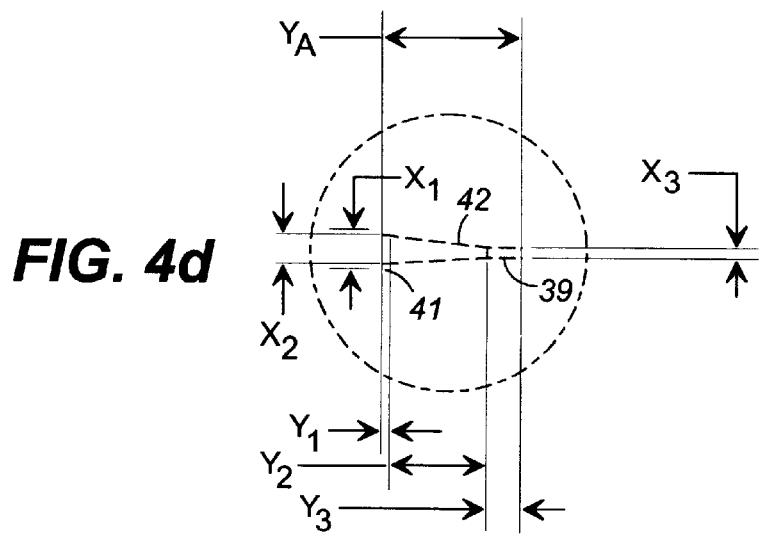
FIG. 4d

BICONIC COATING DIE FOR MAKING COATED OPTICAL FIBERS

FIELD OF THE INVENTION

This invention relates to coating optical fibers and, more particularly, to an apparatus for applying multiple coatings at high speeds.

BACKGROUND OF THE INVENTION

Optical fiber production generally involves drawing the fiber, which usually is of silica glass, and then applying a dual layer of coating materials to the fiber. A first layer typically comprises a relatively soft material and the second layer typically comprises higher modulus curable polymeric material for maintaining high strength and abrasion resistance. Each fiber thus coated must be capable of withstanding, over its entire length, a maximum stress level to which the fiber will be exposed during installation and service. A single fiber failure can result in the loss of several hundreds of circuits. The coating, dual or otherwise, should function to prevent airborne particles from impinging upon and adhering to the surface of the drawn fiber, which could weaken it or even affect its transmission properties. Also the coating shields the fibers from surface abrasion, which could occur as a result of subsequent manufacturing processes and also handling during installation.

Optical fibers are usually coated during a wet coating process which typically involves drawing the fiber through a reservoir of liquid polymer material and then curing the liquid polymer to harden it by exposure to curing radiation, such as, for example, ultra-violet light. In the dual coating process, the coatings are applied in tandem or simultaneously (within the same applicator or die assembly). The tandem arrangement applies a first coating layer which is then cured, and then the second coating layer is applied and cured. In the simultaneous dual coating arrangement, both coats are applied after which they are cured. In both cases, the primary coating is typically a low modulus material and the second coating is a relatively high modulus material. During the wet coating process, air bubbles may become entrained between the fiber and the first or primary and secondary layers, or within the actual layers themselves. An air/coating interface can become unstable at higher speeds which leads to the formation of bubbles. Such bubbles give rise to a number of problems. Bubbles can cause losses in signal transmission by, for example, causing inhomogeneity of the modulus near the glass surface which can cause mechanical distortion of the fiber. In addition, bubbles can weaken the mechanical strength of the coated fiber.

There has been, and continues to be, increasing emphasis on fiber waveguide draw speeds. Much effort has been expended on increasing fiber velocity in the coating process while avoiding the formation of bubbles in the coating layers. In U.S. Pat. No. 4,246,299 of Ohls, a fiber is passed through an applicator having a die body that defines a small, vertically oriented, longitudinally tapered passage having a reservoir disposed about it. A series of radial ports provide fluid communication between the reservoir and the passage. Turbulence within the coating material, which causes entrapment of air bubbles, is reduced by maintaining the level of coating material in the passage. In U.S. Pat. No. 4,374,161 of Geyling et al. there is shown a coating arrangement wherein the fluid coating material is directed radially toward the fiber. The passage diameter for the fiber is large enough to prevent contact with the fiber, while the pressure of the fluid coating material is high enough to substantially prevent air from entering the applicator. In U.S. Pat. No. 4,480,898 of Taylor, there is shown a dual coating applicator having a die that provides for formation of a gap between the die and the first coated layer. A second die is located at the exit of the first die, with the second coating material flowing through a narrow passage between the first and second dies. The second die also provides for a gap so that the second layer is applied at a free surface at the point of contact with the first layer. This arrangement has been found to eliminate instabilities and coating non-uniformities at increased speeds.

Despite the numerous arrangements for reducing turbulence at high fiber velocities, it has, thus far, been extremely difficult to achieve uniform and consistent results with fiber velocities greater than 14 m/sec. In addition, the coating operation itself, in the foregoing arrangements, requires an operator to monitor and continuously adjust fluid pressure, and to adjust orientation of the die, for example, to insure coating concentricity. Thus, the coating processes of the prior art are susceptible to a great deal of improvement.

SUMMARY OF THE INVENTION

The present invention, in a preferred embodiment thereof, is a dual coating applicator for an optical fiber which eliminates or overcomes many of the problems present in prior art arrangements, and which produces consistent results at fiber velocities in excess of 20 m/sec and as great as 33 m/sec, a rate that has not been approached thus far in the prior art.

The applicator of the invention uses a smaller entry die with no coating set point above the entry die, thereby eliminating the need for operator pressure control, the applicator has increased fiber centering forces for improved process stability and prevents wandering of the fiber in the die, and which reduces coating concentricity sensitivity to die position and tilt, thereby reducing the need for operator adjustments.

In greater detail, the applicator of the invention has a bi-conic entry port having a minimum diameter within a range of 200$\mu$–400$\mu$, which opens into a primary coating fluid reservoir into which the fluid coating under pressure is applied through multiple ports. A high pressure gradient is then created halfway to the entry port passage and the reservoir which inhibits fluid flow into the passage. A primary coating die having a bi-conic passage therethrough is located at the reservoir exit and functions to size and center the primary coating on the fiber. As the fiber passes through the first biconic die passage, the high pressure gradient prevents bubble incorporation in the coating. The coating recirculation in the primary coating fluid reservoir can act to center the fiber and prevent it from touching the walls of the entry die, providing the recirculation pattern is properly formed to generate sufficient centering forces. However, a conic angle of approximately 12 degrees leading into the primary coating die generates the major centering forces for the applicator. The minimum diameter of the passage is also approximately 200$\mu$–400$\mu$, depending upon the desired coated fiber diameter, the coating material, and the fiber velocity. A first conic angle of approximately 60° and a second conic angle of approximately 12° leading into a passage diameter of approximately 9 mils produces an almost ideal recirculation pattern at high speeds for generating the desired centering forces, and the coated fiber emerging from the die is concentric, with a maximum variation in fiber diameter of 1–2 $\mu$. The bi-conic passage opens into a second reservoir having the secondary fluid coating under pressure therein, and the fiber exits through an exit die having a passage diameter of approximately 500 $\mu$, where a final sizing and centering occurs. This final diameter depends upon the desired coated fiber diameter, the coating material, and the fiber velocity. As will be apparent hereinafter, the angles of the bi-conic passages as well as their diameters, are important for achieving the desired result. After emergence from the exit die, the coatings are cured by suitable means.

The basic principles of the invention, as well as the features thereof, are equally applicable to both dual and tandem processing, as will be apparent from the following detailed description, read in conjunction with the drawings.

DESCRIPTION OF THE DRAWINGS

FIGS. 4a, 4b, 4c and 4d are various views of the primary coating die of the applicator of FIG. 1.

DETAILED DESCRIPTION

The following description is directed to a method and apparatus for dual coating of optical fibers, at speeds or fiber velocity hereto considered unachievable, and wherein the coatings are of good quality, being substantially bubble free and concentric within acceptable tolerances. It is to be understood that the method of application and the applicator itself are adaptable for use in coating other filamentary materials besides the silica glass generally used in optical fibers.

Figure 1:
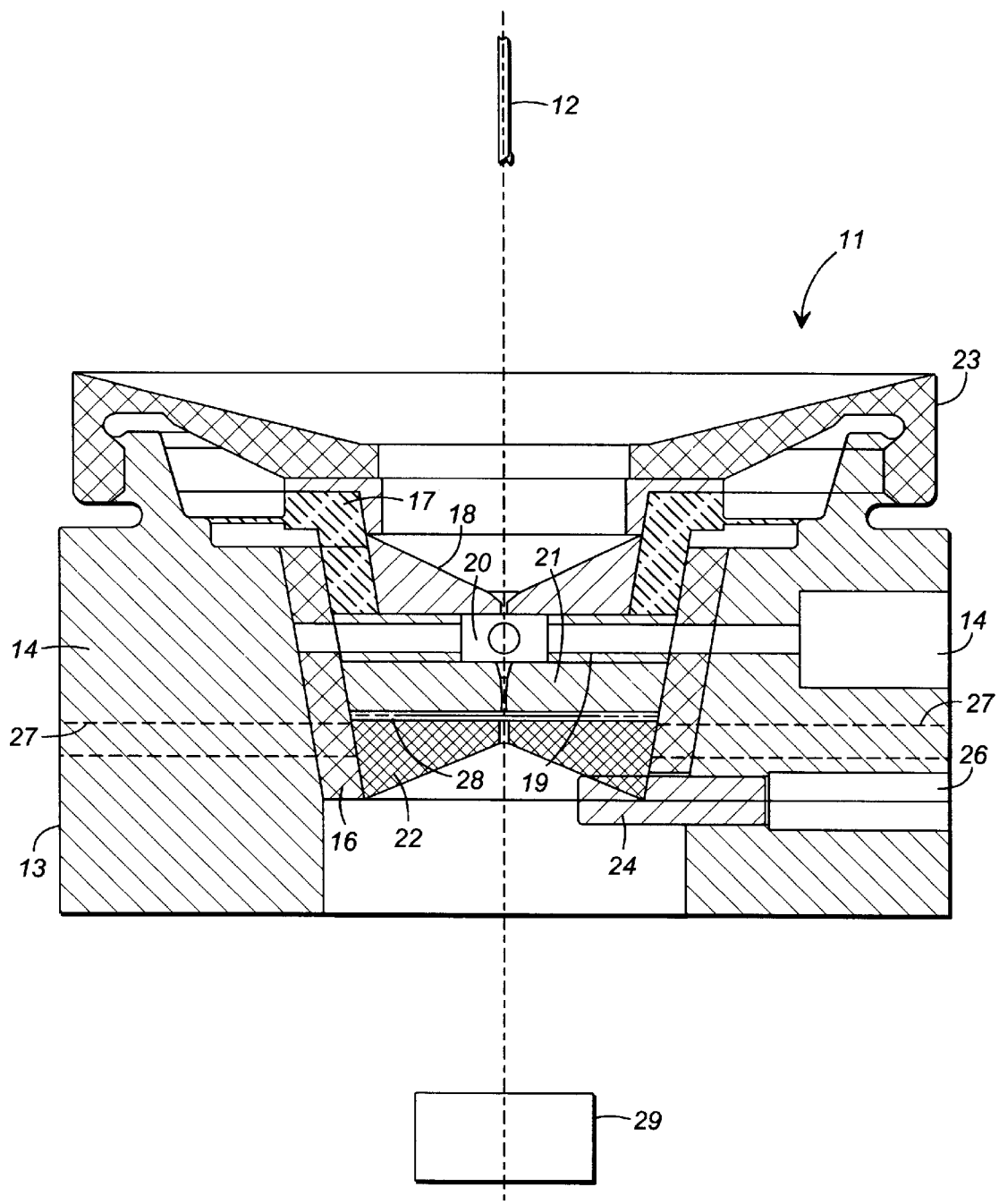
FIG. 1 is an elevation view in cross-section of a dual coating applicator in accordance with the present invention.

In FIG. 1 there is shown, in cross-section, a dual coating applicator 11 embodying the principles and features of the present invention. For clarity, the fiber 12 to be coated has not been shown passing through the applicator 11, but it is to be understood that it does so pass along the centerline in the direction of the arrow, as shown. Applicator 11 comprises a block 13 having ports 14 and 27 (shown in dashed lines) therein for the radial introduction of coating material as will be discussed hereinafter and further having tapered sleeves 16 and 17 for holding an entrance die 18, a primary die cavity member 19 which forms a fluid coating reservoir 20, a middle or primary die 21 and an exit die 22. A retaining cap 23 functions to apply pressure on the tapered members and on the dies. which, as shown, are also tapered, to retain them in place. In addition, a locating pin 24, insertable through bore 26 in block 13 functions to circumferentially locate the die assembly, as will be discussed hereinafter. As is shown in FIG. 1, a secondary coating cavity 28 is formed between the exit end of primary die 21 and the entrance end of exit die 22.

All three dies 18, 21, and 22 have central passages therein which, to avoid confusion, are not numbered in FIG. 1. These passages are critical and will be discussed in greater detail hereinafter. In the operation of applicator 11, which is a simultaneous dual coating applicator, the fiber 12 is threaded through the passage in entrance die 18 and is drawn down through primary cavity member 19, through the passage in primary die 21, through secondary cavity 28 and through the passage in exit die 22. After emerging from exit die 22, the coated fiber is passed through a curing station 29 which may cure the coatings with ultraviolet radiation, heat, or whatever curing radiation is appropriate for the particular coating materials used. Typical of primary or inner coating materials are soft low modulus materials such as silicone, hot melt wax, or any of a number of acrylic or polymeric materials having a relatively low modulus. Typical materials for the second or outer coating are high modulus (3000–5000 cp) polymerics or acrylics. In practice in a simultaneous applicator as shown in FIG. 1. both materials may be low and high modulus acrylic.

In greater detail, in the coating process of the invention using the applicator 11. the fiber 12 passes through entrance die 18 into the reservoir 20 where the primary or inner coating is contained under pressure. The diameter of the passage in the entrance die is chosen such that it is sufficient to avoid fiber impingement thereon and sufficiently narrow that a high pressure gradient is created such that the liquid coating under pressure in reservoir 20, instead of rising up through the passage to the top where it encounters air, and hence entrains air bubbles is effectively blocked. Thus, air is prevented from entering the reservoir, thereby relieving the operator of continuously monitoring the fluid pressure. It is known to then seal the reservoir from the air, as is shown in U.S. Pat. 4,374,161 of Geyling et al. However, the Geyling et al. apparatus for accomplishing such a result is considerably more complicated than the present arrangement and is not, apparently, amenable to extremely high velocity fiber coating, as is the present arrangement. A coating pressure of 150–200 psi for a passage diameter approximately twice that of the fiber to be coated has been found to be sufficient to eliminate bubbles at fiber velocities in the range of 25 m/sec to 35 m/sec. The now coated fiber passes from the reservoir 20 into primary die 21 which has a passage therethrough having a bi-conic section and a straight section. The entrance angle of the passage, i.e., the first conic section, is approximately 60° and that of the second conic section is approximately 12°. The second section connects to a straight passage of approximately 0.009 inches diameter. At the velocities of operation, this combination of an entrance angle of 60° and a small second angle, 12°, and a small but sufficient diameter passage of sufficient length function to generate centering forces for the coating and the fiber as well as sizing forces due to the passage diameter. The fiber, as it enters the die, has an excess amount of coating thereon, which, as the fiber passage through to decreasing diameter of the conic section is, in effect, scraped off of the coated fiber and tends to recirculate back toward the reservoir 20. This movement of the excess coating material is shaped by the narrow, small angle conic section into exerting radially uniform centering forces on the coated fiber as it passes through into the straight portion of the passage, where it is sized. The bi-conic configuration of the passage in the primary die 21 insures that there is less than one micron (1$\mu$) of variation in the coated fiber diameter, whereas, without the bi-conic configurations, variations of 4 to 5 microns may occur. The narrow angle of the conic section (12°) as opposed to a prior art angle of 24° or more and its length shape the recirculating flow of the excess coating to insure proper centering.

The secondary coating in the cavity or reservoir 28 is under a pressure of 50–250 psi which further functions to seal off the die passages from the air. The passage in the exit die performs a sizing operation on the second or outer coating so that the coated fiber emerges from the applicator 11 with centered coatings of proper or desired diameter.

FIGS. 2 through 5 depict various components of applicator 11 in greater detail.

Figure 2:
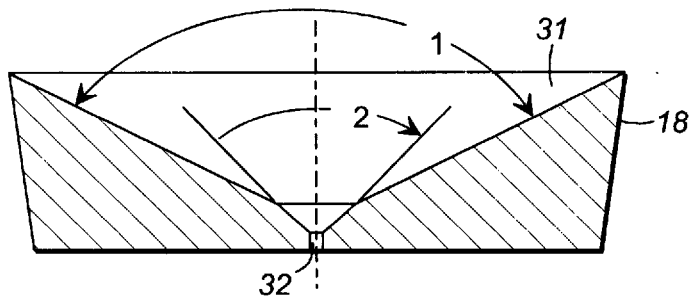
FIG. 2 is a cross-sectional view of the entrance die of the applicator of FIG. 1.

FIG. 2 is a cross-sectional view of entrance die 18, which is preferably made of hardened steel, such as, for example, tool steel. Die 18 has a bi-conic opening 31 having a first cone angle $\varnothing_1$, leading to a second cone angle $\varnothing_2$, which in turn leads to a straight passage 32. The angle $\varnothing_1$, is in a range of 125°–130°, while the angle $\varnothing_2$ is approximately 90°. These angles or sloped surfaces function primarily to guide the fiber as it is first being threaded into passage 32, hence they can vary somewhat from the angles given. Passage 32 is, on the other hand, more critical as to its diameter. It has been ascertained that a diameter of 0.009–0.010 inches functions to allow passage of fiber 12 without striking the walls of the passage, while also preventing flow of the pressurized coating material to the top thereof where it can contact the air.

Figure 3A:
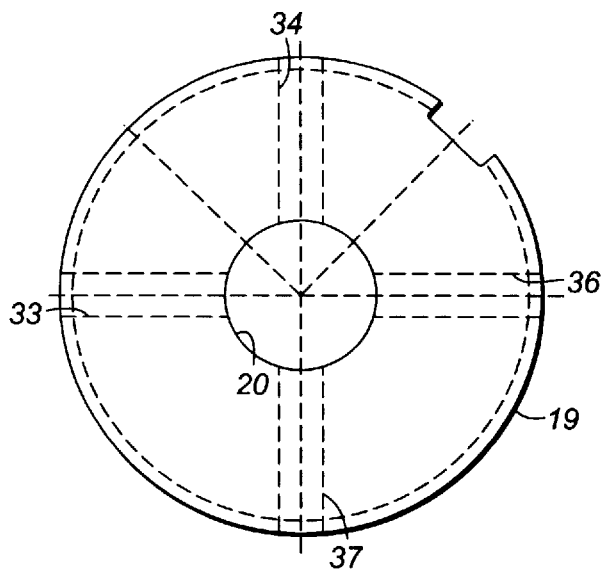
FIGS. 3a, 3b, 3c and 3d are various views of the cavity member of the applicator of FIG. 1.
Figure 3C:
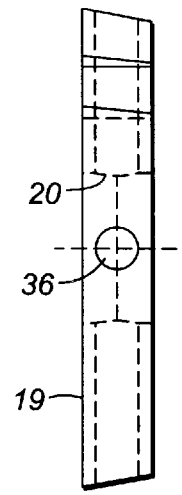
Figure 3B:
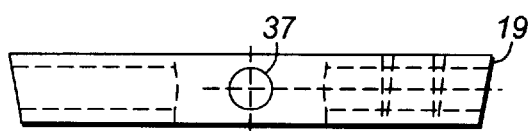
Figure 3D:
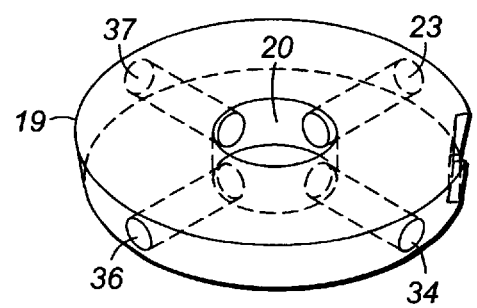

FIGS. 3a, 3b, 3c, and 3d are different views of the primary cavity member 19. preferably made of hardened steel and which, as can be seen, has four fluid passage bores 33, 34, 36, and 37 which communicate with bores 14 in block 13, and which lead to the center cavity or reservoir 20, into which the liquid coating is delivered under pressure. FIG. 3d is a perspective view of member 19 showing the relationship of bores 33, 34, 36, and 37 to reservoir 20.

FIGS. 4a, 4b, 4c, and 4d are different views of the primary die 21, wherein FIG. 4b is a cross-sectional elevation view along the line I—I of FIG. 4a, and FIG. 4d is a detail taken from the circled portion of FIG. 4c. Die 21, which is also preferably made of hardened steel, has a central bi-conic passage 38 opening into a straight passage 39. Bi-conic passage has a first conic section 41 at an angle $\varnothing_3$ and a second conic section 42 at an angle $\varnothing_4$. Angle $\varnothing_3$ can be approximately 60° however, angle $\varnothing_4$ is critical in forming or shaping the fluid recirculation to produce the desired centering forces. In practice, at fiber velocities in the 25 m/sec–35 m/sec range, an angle $\varnothing_4$ of 12° has been found to be optimum. This angle $\varnothing_4$ can vary slightly depending upon fiber diameter, velocity and the materials used, and is much smaller than what has heretofore been used in the prior art, where it is typically in the neighborhood of 24°0. Such a large angle has proven to be unsuitable for high fiber velocities. FIG. 4d depicts the details and dimensional parameters of the passage through die 21 in an embodiment that has been found to yield the desired results as discussed hereinbefore. Conic section 41 has an entrance diameter $X_1$ and a depth $Y_1$, section 42 has an entrance diameter $X_2$ and a depth (or length) $Y_2$ and straight section 39 has a depth or length $Y_3$ and a diameter $X_3$. Member 21 has a thickness $Y_4$.

Figure 5A:
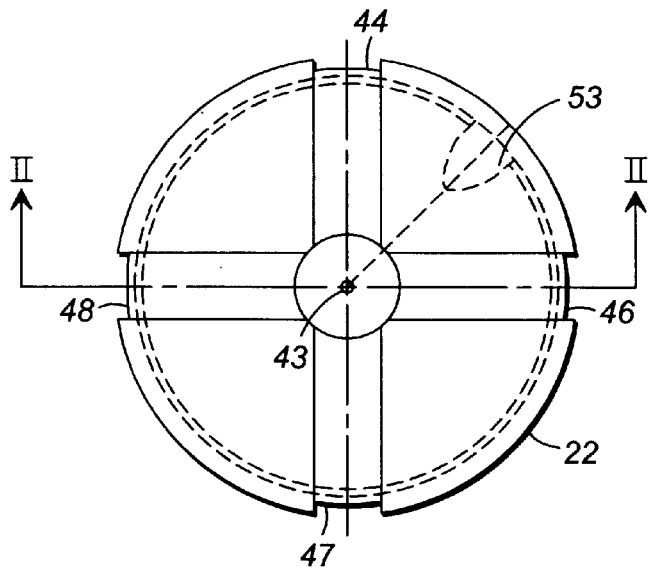
FIGS. 5a, 5b, 5c and 5d are various views of the exit die of the applicator of FIG. 1
Figure 5C:
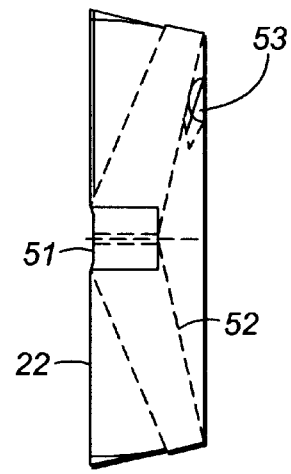
Figure 5B:
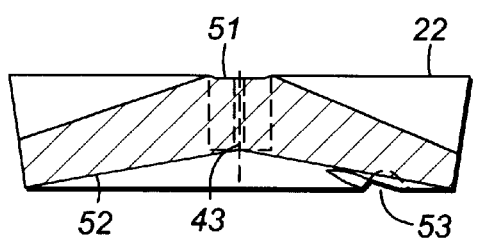
Figure 5D:
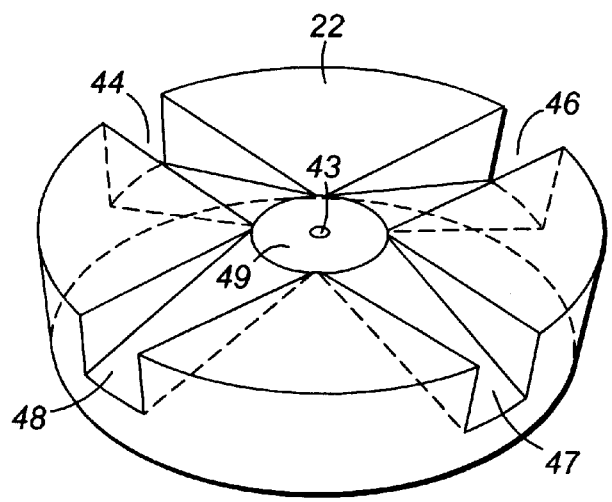

FIGS. 5a through 5d are various views of the exit die 22. with FIG. 5b being a cross-section thereof along the line II—II of FIG. 5a, and FIG. 5d being a perspective view thereof. Die 22 has a straight central fiber passage 43 therethrough which functions to size the second coating. Thus, the diameter of passage 43 is proportional to the desired outer diameter of the dual coated fiber, and hence, may vary with that diameter. In one embodiment, the diameter of passage 43 is 0.2. Passage 43 may also have, as an entrance portion to passage 43, a conic section (not shown) for accommodating excess fluid coating material. The angle of this conic section may be, for example, approximately 24°, with an entrance diameter of approximately 0.0445 in. Die 22, which is preferably of hardened steel, has four sloped fluid coating passages 44, 46, 47, and 48 which conduct the fluid under pressure to the top of a central hub portion 49 which has a depressed portion 51 which forms fluid reservoir 28 between dies 21 and 22, as seen in FIG. 1. The underside 52 of die 22 has a curved locator notch 53 into which pin 24, shown in FIG. 1, fits to locate passages 44, 46, 47, and 48 relative to bores 27, shown in FIG. 1.

In one example of the applicator of FIG. 1, $\varnothing_1$ was 127°, $\varnothing_2$ was 90°, the diameter of passage 32 was 0.0090 in., $\varnothing_3$ was 60°, $\varnothing_4$ was 12°, $X_1$ was 0.0362 in., $X_2$ was 0.0270 inc., $X_3$ was 0.009 in., $Y_1$ was 0.0080 in., $Y_2$ was 0.0856 in., $Y_3$ was 0.0314 in.. and $Y_4$ was 0.1250 in. With a fluid pressure of approximately 150 psi, excellent results were achieved at fiber velocities in excess of 25 m/sec.

The principles of the present invention are equally applicable to a tandem coating process, not shown. Tandem coating has the advantage of allowing inspection after application and curing of the first coat before the second coat is applied. A tandem coating arrangement would allow inspection and curing after the fiber emerges from primary die 21, after which the fiber would be passed through die 22 or an equivalent.

In concluding the detailed description, it should be noted that it will be obvious to those skilled in the art that many variations and modifications may be made to the preferred embodiment without substantial departure from the principles of the present invention. All such variations and modifications are intended to be included herein as being within the scope of the present invention, as set forth in the claims. In the claims hereafter, the corresponding structure, materials, acts and equivalents of all means or step plus function elements are intended to include any structure, material, or acts for performing the functions with other claimed elements as specifically set forth.

We claim:

1. A fiber coating process comprising passing a fiber at a velocity in excess of twenty meters per second through an entrance die bi-conic passage into a coating fluid reservoir;

supplying coating fluid to the reservoir at a pressure such that bubbles are prevented from entering the coating fluid;

passing the fiber through a second die passage having a bi-conic section and a straight section having an exit end while controlling the re-circulation of excess coating material to generate centering forces within the bi-conic section of the passage, and thereafter sizing the coated fiber in the straight section prior to curing the coating; and curing the coating.

2. A fiber coating process as claimed in claim 1 and further including the steps of applying and sizing a second coat on the fiber by passing the fiber through a second reservoir immediately adjacent the exit end of the straight section of the second die passage;

supplying the second coating material under pressure to the second reservoir; and a third die having a passage having a diameter sufficient to size the dual coated fiber.

3. A fiber coating process as claimed in claim 2 wherein the step of passing the fiber through the second reservoir and the third die precedes the step of curing the coating.

4. A fiber coating process as claimed in claim 2 wherein the pressure of the second coating material is in the range of 50–250 psi.

5. A fiber coating process as claimed in claim 1 wherein the linear velocity of the fiber being coated is in the range of 25–35 meters per second.

6. A fiber coating process as claimed in claim 1 wherein the pressure of the coating fluid supplied to the reservoir is in the range of 150–200 psi.

7. An applicator assembly for applying a coating to a fiber at a fiber velocity equal to or greater than 25 meters per second, said applicator comprising:

an entrance die having a passage therethrough having a bi-conic section and a straight section having an exit end, the diameter of said straight section being sufficient to avoid fiber impingement thereon and sufficiently small to prevent coating fluid under pressure excessively rising therein;

a coating fluid reservoir adjacent said exit end of said straight section;

means for applying fluid coating material under pressure to said reservoir; and a primary die adjacent said fluid reservoir and having an entrance end and an exit end, said primary die having a fiber passage therethrough having in sequence a bi-conic section of a relatively wide entrance angle and a narrow angled conic section and a straight section, the angle of said narrow angled conic section being chosen to create fiber centering forces within said fiber passage and said straight section having an exit end and having a diameter sufficient to size the coated fibers.

8. An applicator assembly as claimed in claim 7 and further comprising an exit die having a passage therethrough;

means including said exit die and the exit end of said primary die for forming a second coating fluid reservoir;

means for applying fluid coating under pressure to said second reservoir; and said passage through said exit die having a diameter sufficient for sizing a second coating on the fiber.

9. An applicator assembly for applying a coating to a fiber at a fiber velocity greater than 20 meters per second, said applicator comprising:

an entrance die having a passage therethrough having a conic section and a straight section having an exit end, the diameter of said straight section being sufficient to avoid fiber impingement thereon and sufficiently small to prevent coating fluid under pressure excessively rising therein;

a coating fluid reservoir adjacent said exit end of said straight section;

a primary die adjacent said fluid reservoir, said primary die having a fiber passage therethrough having, in sequence, a bi-conic section of a relatively wide entrance angle and a narrow angled conic section and a straight section, the angle of said narrow angled conic section being approximately 12° to create fiber centering forces within said fiber passage and said straight section having an exit end and having a diameter sufficient to size the coated fibers.

10. An applicator assembly as claimed in claim 9 wherein the length of said narrow angled conic section is approximately 0.0856 inches.

11. An applicator assembly as claimed in claim 10 wherein the diameter of said straight section of said fiber passage is approximately 0.009 inches.

12. An applicator assembly as claimed in claim 11 wherein the diameter of said passage in said entrance die is 0.009–0.010 inches.

* * * * *